Dec. 6, 1927.
A. C. FISCHER
MOLD FOR EXPANSION JOINT STRIPS
Original Filed May 26, 1922
1,651,878
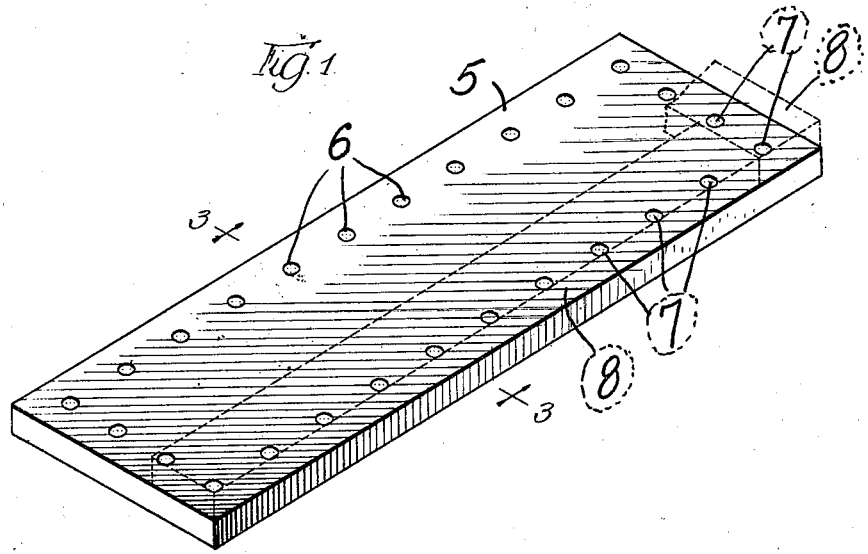
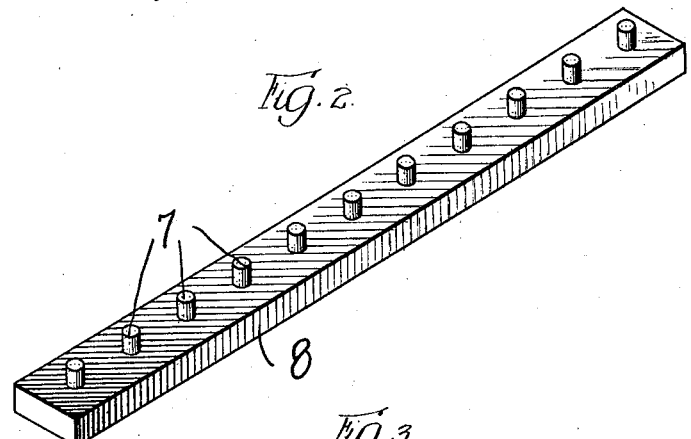
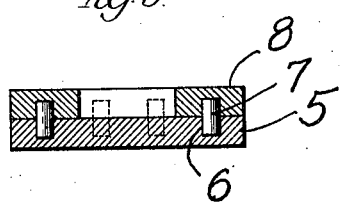
Inventor:
Albert C. Fischer,
by
atty.

Patented Dec. 6, 1927.

1,651,878

UNITED STATES PATENT OFFICE.

ALBERT C. FISCHER, OF CHICAGO, ILLINOIS.

MOLD FOR EXPANSION-JOINT STRIPS.

Original application filed May 26, 1922, Serial No. 563,832. Divided and this application filed April 19, 1926. Serial No. 103,001.

This application is a division of my application Serial No. 563,832, filed May 26, 1922, for expansion joint installer, and has particular reference to the subject matter described with reference to Figures 2 and 3 of my said application.

The primary object of my present invention is to provide means whereby strips of expansion material may be molded on the job so to speak, so as to make it possible for contractors and others dealing in the installation of joint to carry a simple convenient installing equipment on the job and mold the joint as it is required.

In the accompanying drawing which illustrates the preferred embodiments of my invention Figure 1 is a plan view of the mold; Figure 2 is a plan view of the molding strip; Figure 3 is a cross-section in elevation of the mold with the molding strip applied thereto.

Referring now to the drawings in detail —5— represents the molding board or base of the mold, which may be produced of any material suitable for the purpose, for instance, sheet metal, wood, or composition. The base in this respect simply comprises a boardlike member having a series of perforations or openings —6— at spaced intervals along its respective edges. These perforations or openings may or may not extend thru the thickness of the base, but the same should be made so as to receive the projections —7— on the strips —8—, so that the strips may be applied to the base in a manner best shown in Figure 1, to form side walls for the mold. The strips will be of the proper width and length to cooperate with one another when applied to the base, so as to make the desired marginal edge so that the material from which the joint is molded may be poured into the mold thus formed and permitted to set.

In most instances the joint material will be produced from a mixture of asphalt and some manner of filler suitable for the purpose. The projections —7— on the strips —8— may be made by employing dowels, pins or any other suitable means which will project from the surface of the strips and accommodated by the openings —6— of the base.

In putting the idea into practice it is proposed to supply the contractor with joint material in suitable packages.

The strips of joint to be formed will ordinarily be in lengths of about five feet and of a thickness of one quarter to three quarters of an inch.

I claim:

A knock-down form for molding expansion joint strips, comprising a base board having a series of aligned dowel holes in its thickness along the margins thereof and spaced inwardly from the margins thereof, and side and end walls for the base, each having dowel pins imbedded therein and adapted to project from the surface thereof in alignment intermediate the margins of the walls, said dowel pins adapted to engage the dowel holes for attaching the walls to the base with the outer margins of the walls flush with the sides of the base, the walls being relatively wide as compared to their height; whereby a relatively broad supporting contact is made between the walls and the surface of the base on opposite sides of the dowel pins.

Signed at Chicago, Illinois, this 13th day of April, 1926.

ALBERT C. FISCHER.